United States Patent
N et al.

(10) Patent No.: US 12,314,784 B2
(45) Date of Patent: May 27, 2025

(54) POLICY-DRIVEN ALERT MANAGEMENT

(71) Applicant: Dell Products L.P., Round Rock, TX (US)

(72) Inventors: Ravishankar N, Bangalore (IN); Muniswamy Setty K S, Bangalore (IN); Praveen Kumar H P, Bangalore (IN); Praveen Naik, Bangalore (IN); Lakshmikanth Dhanaraju, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 308 days.

(21) Appl. No.: 17/951,314

(22) Filed: Sep. 23, 2022

(65) Prior Publication Data

US 2024/0036948 A1 Feb. 1, 2024

(51) Int. Cl.
*G06F 9/54* (2006.01)

(52) U.S. Cl.
CPC .................. *G06F 9/542* (2013.01)

(58) Field of Classification Search
None
See application file for complete search history.

(56) References Cited

U.S. PATENT DOCUMENTS

| | | | |
|---|---|---|---|
| 10,860,383 B2 | 12/2020 | Debata et al. | |
| 11,663,058 B1 * | 5/2023 | Wojciak | G06F 18/2113 719/318 |
| 2004/0073637 A1 * | 4/2004 | Larson | H04L 12/4641 709/222 |
| 2010/0146582 A1 | 6/2010 | Jaber et al. | |
| 2021/0064112 A1 | 3/2021 | Jenne et al. | |
| 2021/0089370 A1 * | 3/2021 | Dukhovny | G06F 11/301 |
| 2022/0318202 A1 * | 10/2022 | Jha | G06F 9/542 |

* cited by examiner

*Primary Examiner* — Craig C Dorais
(74) *Attorney, Agent, or Firm* — Larson Newman, LLP (57) ABSTRACT

An information handling system receives a notification regarding a state of the information handling system, and determines an alert management policy associated with the notification regarding the state of the information handling system. The system also applies an alert management action to enforce the alert management policy.

17 Claims, 3 Drawing Sheets

POLICY-DRIVEN ALERT MANAGEMENT

FIELD OF THE DISCLOSURE

The present disclosure generally relates to information handling systems, and more particularly relates to policy-driven alert management.

BACKGROUND

As the value and use of information continue to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system receives a notification regarding a state of the information handling system, and determines an alert management policy associated with the notification regarding the state of the information handling system. The system also applies an alert management action to enforce the alert management policy.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
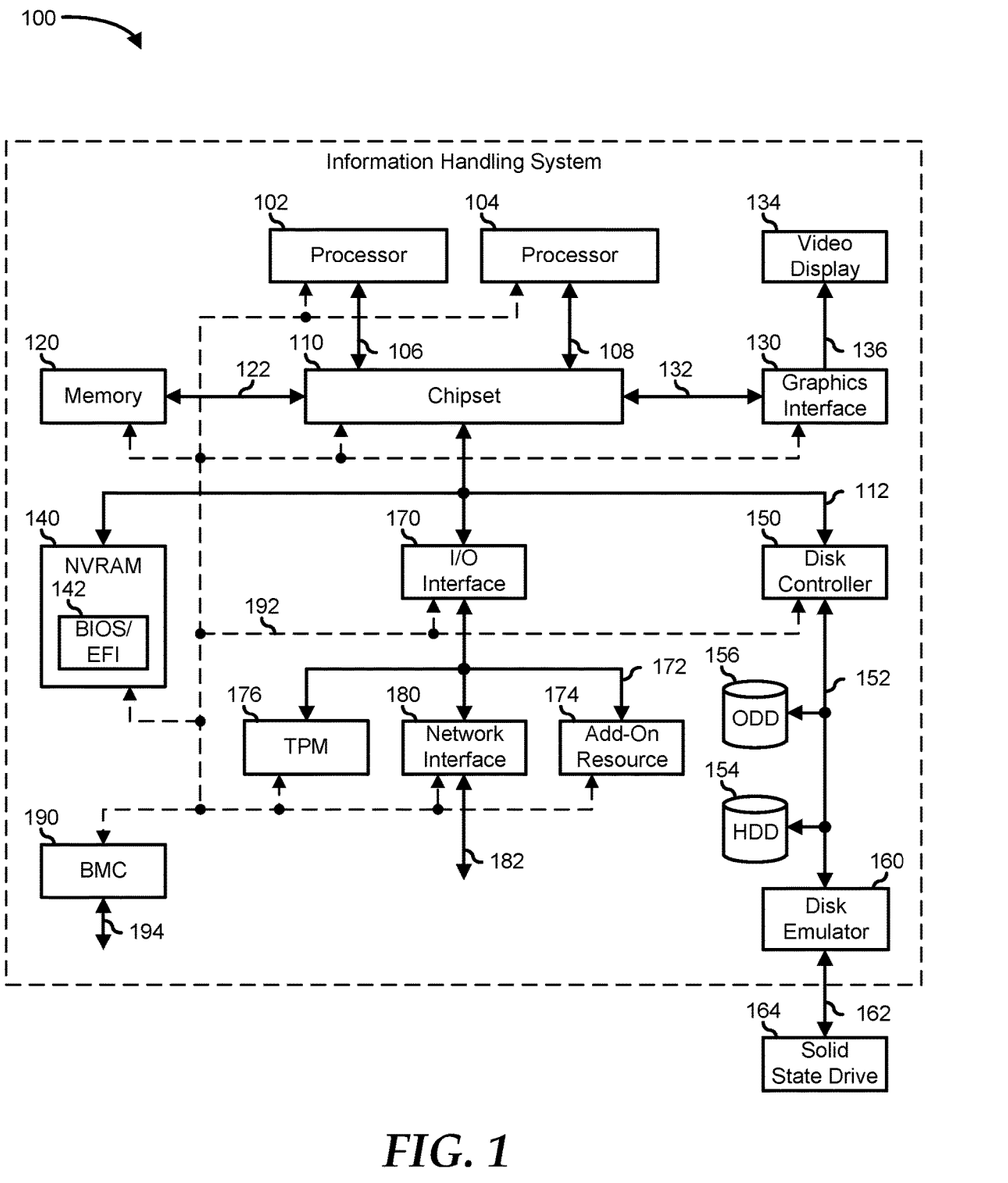
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or an add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular-based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Alerts triggered by a management controller, such as BMC 190 of FIG. 1, are typically generic and do not hold contextual information about the status of the host system under which these alerts are generated. For example, alerts associated with a switch port problems may be transmitted while the information handling system is being initialized, which would be resolved once the operating system is successfully loaded. As a result, a customer gets flooded with alerts that are false positives and do not accurately reflect the state of the host system. In addition to loading the network bandwidth because of the huge number of alerts, the management controller may generate false support cases for the information technology administrators to investigate. To address these and other concerns the present disclosure provides a system and method for policy-driven alert management, wherein based on a knowledge of the current context or state of the host system, the management controller may apply rules and perform actions to minimize the number of false positive alerts and generation of false support cases to investigate these cases.

Figure 2:
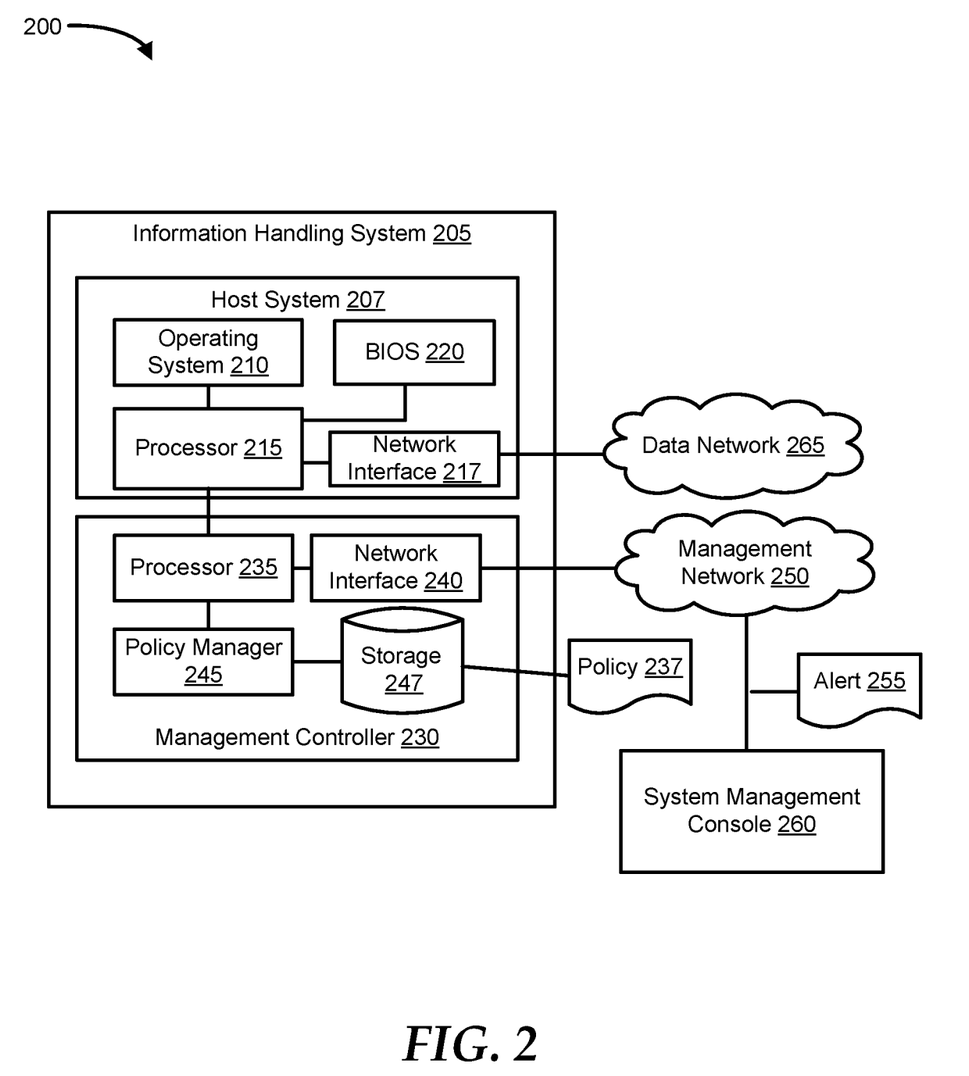
FIG. 2 is a block diagram of an information handling system for policy-driven alert management, according to an embodiment of the present disclosure.

FIG. 2 shows a system 200 for policy-driven alert management of an information handling system. System 200 includes information handling system 205, a management network 250, a system management console 260, and a data network 265. Information handling system 205 includes a host system 207 and a management controller 230. Host system 207 further includes an operating system 210, a processor 215, a network interface 217, and BIOS 220. In various embodiments, information handling system 205 may not include each of the components shown in FIG. 2, and connections between components may be omitted for descriptive clarity. Additionally, or alternatively, information handling system 205 may include various additional components in addition to those that are shown in FIG. 2. Furthermore, some components that are represented as separate components in FIG. 2 may in certain embodiments instead are integrated with other components. For example, in certain embodiments, all or a portion of the functionality provided by the illustrated components may instead be provided by components integrated into one or more processor(s) as a system-on-a-chip.

Information handling system 205 may in some embodiments include a chassis configured to house a multiple servers or "blades." In yet other embodiments, information handling system 100 may include a storage enclosure configured to house a multiple physical disk drives and/or other computer-readable media for storing data, also referred to as physical storage resources. In an operation, processor 215, operating system 210, and BIOS 220 may comprise at least a portion of host system 207 of information handling system 205. Information handling system 205 may also include in-band and/or out-of-band management agents that can generate an event, notification, alert, etc. that may be transmitted to another information handling system via data network 265 or to system management console 260 via management network 250.

Processor 215 may include any system, device, or apparatus configured to interpret and/or execute program instructions and/or process data, and may include a microprocessor, microcontroller, digital signal processor, application-specific integrated circuit, or any other digital or analog circuitry configured to interpret and/or execute program instructions and/or process data.

Operating system 210 may include any program of executable instructions (or aggregation of programs of executable instructions) configured to manage and/or control the allocation and usage of hardware resources such as memory, processor time, disk space, and input/output devices. Operating system 210 may also provide an interface between such hardware resources and application programs. Operating system 210 can detect the current state, a state transition, and/or failure of host system 207 and notifies management controller 230 accordingly. For example, if host system 207 is in a particular state, such as in a system management mode, operating system 210 may notify management controller 230 when the host system 207 enters and exits the system management mode. Operating system 210 may inform management controller 230 by sending a notification event or message. Operating system 210 may also store the notification event or message in a shared memory area (SMA). In another embodiment, operating system 210 may provide a signal, such as by setting a flag or register value.

Network interface 217 may include any suitable system, apparatus, or device operable to serve as an interface between information handling system 205 and one or more other information handling systems via an in-band network, such as data network 265. Network interface 217 may enable information handling system 205 to communicate using any suitable transmission protocol and/or standard, such as through non-volatile memory express driver and commands. In these and other embodiments, network interface 217 may include a NIC. In addition, network interface 217 may be enabled as a LAN-on-motherboard card.

BIOS 220 can detect a current state and state transition of host system 207 and notify management controller 230 such as its entering or exiting the pre-boot environment and hold control of host system 207 until handover to operating system 210 on a successful boot process. BIOS 220 may also detect whether the boot process is unsuccessful. When host system 207 goes through a state transition such as enter and exit a pre-boot mode, BIOS 220 can inform management controller 230 of the state of host system 207 via a communication channel, such as a shared memory area. BIOS 220 can also information management controller 230 when host system 207 encounters a failure, such as when the boot process fails. BIOS 220 may inform management controller 230 by sending a notification event or message. BIOS 220 may also store the notification event or message in an SMA. In another embodiment, BIOS 220 may provide a signal, such as by setting a flag or register value.

Management controller 230, which is similar to BMC 190 of FIG. 1, may be configured to provide management functionality for the management of information handling system 205. Such management may be made even if information handling system 205 is powered off or powered to a standby state. Management controller 230, also referred to as a service processor, includes a network interface 240 and a processor 235 which is communicatively coupled to processor 215. Such coupling may be via a universal serial bus, a system management bus, an SMA channel, and/or another communication channel.

Management controller 230 may be configured to enforce an alert management policy, also referred to herein simply as policy without restarting information handling system 205, according to the current context of host system 207. Enforcing the policy may include performing an alert management action, also referred to simply as an action, according to one or more rules, such as blocking or controlling an alert and/or event generation based on a particular policy setting, thereby optimizing management of network bandwidth. For example, blocking the generation of a particular alert and dynamically masking or unmasking network packets. The alert management action may be performed on an alert, notification, event, data/network packet, etc. that is being transmitted via data network 265 and/or management network 250. Management controller 230 may also refrain from performing an action based on the alert management policy.

For example, management controller 230 may mask inbound/out-of-bound alerts and/or network events to system management console 260 when information handling system 205 is at a pre-boot execution environment (PXE) boot process or system management mode. This may be performed to prevent management network 250 and data network 265 from being flooded with events associated with host system 207 while the information handling system 205 a particular state such as under the PXE boot process or system management mode. In particular, management controller 230 may mask NIC events associated with a switch port being toggled while other events may remain unmasked. In another embodiment, management controller 230 may not generate or block a specific alert or the NIC events associated with the switch port when the information handling system is currently at the PXE boot process. The NIC events may be transmitted via data network 265 and/or management network 250.

When management controller 230 receives a signal that information handling system 205 is exiting a particular state, such as exiting the PXE boot process or the system management mode, management controller 230 may enforce another policy based on the current state of information handling system 205. For example, management controller 230 may unmask events associated with host system 207. In particular, management controller 230 may unmask NIC events associated with the switch port.

Network interface 240 may include any suitable system, apparatus, or device operable to serve as an interface between management controller 230 and one or more other information handling systems via an out-of-band management network, such as management network 250 regardless of whether information handling system 205 is powered on and/or has an operating system installed therein. Network interface 240 may enable management controller 230 to communicate using any suitable transmission protocol and/or standard. In these and other embodiments, network interface 240 may include a NIC.

System management console 260 may be communicatively coupled to management controller 230 via management network 250. A user or administrator may use system management console 260 to interact with management controller 230. For example, system management console 260 may be used to display data that has been read from management controller 230 regarding the state of information handling system 205.

Further, system management console 260 may be used to set values of configuration variables, initiate reboot, install updates, and/or complete any other management task as needed. For example, system management console 260 may be configured as an interface for allowing a user to create, modify, delete, categorize, organize, and/or otherwise manage alert management policies for managed information handling systems, such as information handling system 205. System management console 260 may communicate with management controller 230 via management network 250 using an out-of-band communication channel that is separate from an in-band communications channel, wherein the out-of-band channel is isolated from network traffic other than management traffic.

Alert 255 may be transmitted in real-time by management controller 230 to system management console 260 via management network 250. In some cases, alert 255 may indicate an alert management action, which includes a failure and/or a remedial action. Alert 255 may also indicate that a health or performance information handling system 205 has exceeded or met a threshold. In addition, alert 255 may include identifying data of information handling system 205, such as a media access control address, internet protocol address, service tag, etc. Alert 255 may also include contextual information associated with information handling system 205, such as its current state.

Policy 237 may include one or more rules associated with alert management of an information handling system. The rules may be satisfied in the alternative, in conjunction with, or by applying a more complex logical test. In some embodiment, an alert management policy may include temporal specifications to indicate when the policy should be enforced. In one embodiment, the alert management policy may include one or more enabling or disabling trigger events, such as entering or exiting a pre-boot execution environment, entering or exiting a system management mode, enabling or disabling a switch port while the information handling system is in a particular state, etc. When the alert management policy is applicable, management controller 230 may be required to apply such policy and perform the alert management action indicated in the policy accordingly. One of skill in the art may recognize that policy 237 may be one of the various formats and/or data structures. Policy 237 may include one or more properties such as the current state, state transition, start time, end time, etc.

Policy manager 245 may be configured to provide policies used by management controller 230 in its role to provide policy-driven alert management. Policy manager 245 may be integrated with management controller 230 or located remotely. Policy manager 245 may be configured to manage alert management policies of one or more information handling systems, wherein each one of the information handling systems may have different alert management policies for its lifecycle management. In one embodiment, policy manager 245 may store alert management policies in storage 247.

Storage 247 may be a persistent data storage device and can include solid-state disks, hard disk drives, magnetic tape libraries, optical disk drives, magneto-optical disk drives, compact disk drives, compact disk arrays, disk array controllers, and/or any computer-readable medium operable to store data. Storage 247 may include a database or a collection of log files that is a central repository of log messages. Storage 247 may include a database or a collection of files that is a central repository of rules that policy manager 245 may retrieve, store, and utilize.

Those of ordinary skill in the art will appreciate that the configuration, hardware, and/or software components of information handling system 205 depicted in FIG. 2 may vary. For example, the illustrative components within information handling system 205 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
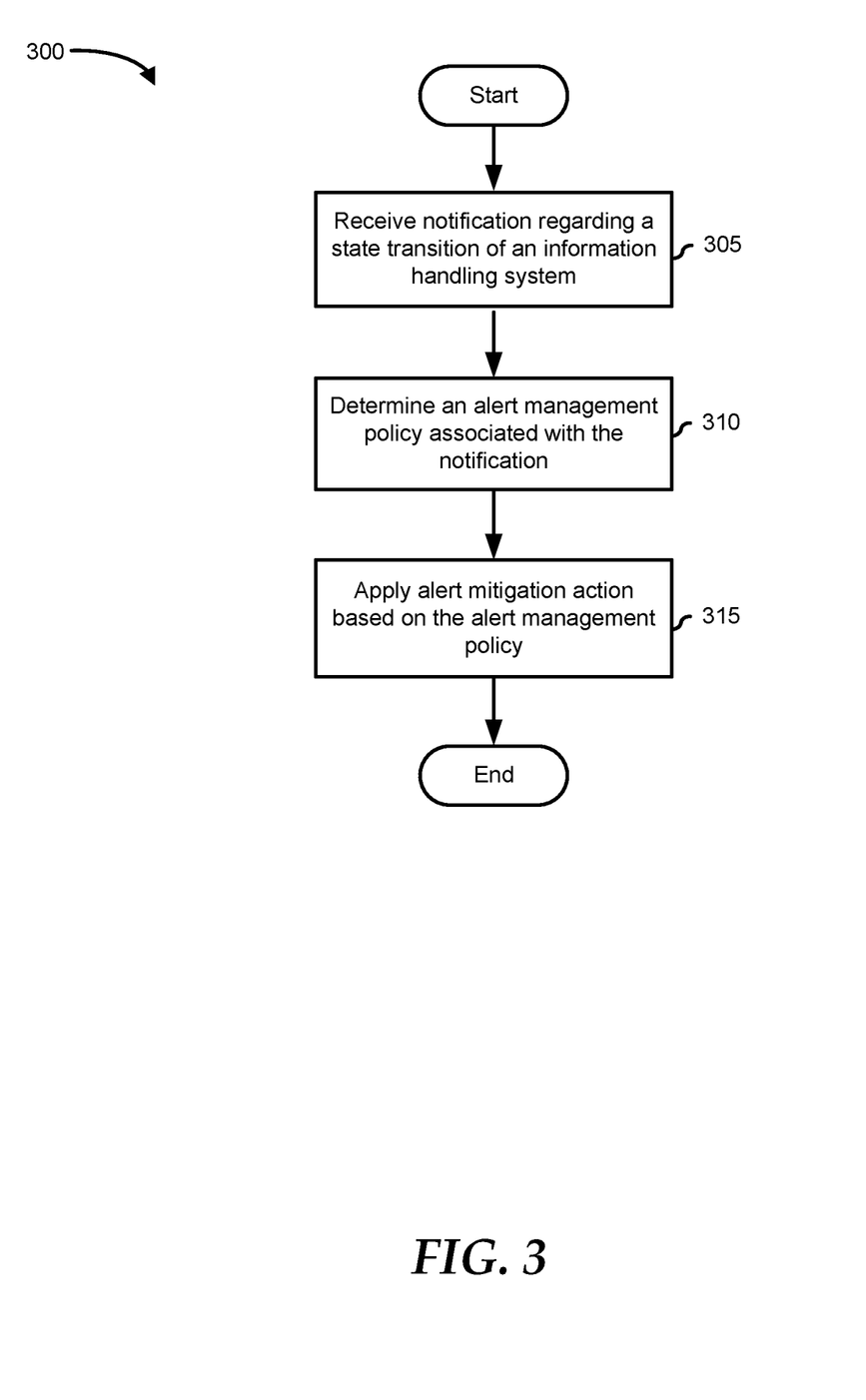
FIG. 3 is a flowchart illustrating an example of a method for policy-driven alert management, according to an embodiment of the present disclosure.

FIG. 3 shows a flowchart of a method 300 for policy-driven alert management. Method 300 may be performed by management controller 230 of FIG. 2 or components thereof. However, while embodiments of the present disclosure are described in terms of system 200 of FIG. 2, it should be recognized that other systems may be utilized to perform the described method. One of skill in the art will appreciate that this flowchart explains a typical example, which can be extended to advanced applications or services in practice.

Method 300 typically starts at block 305, where the method receives a notification regarding a state transition of a managed information handling system. For example, the method may receive a notification from the operating system and/or BIOS. At block 310, the method may determine zero or more alert management policies associated with the notification. If no alert management policy is found, all alerts associated with the information handling system may be transmitted to a system management console via a system management network. In some cases, all of the alert management policies may be invoked. If multiple alert management policies are associated with the notification, one may be selected under a predetermined criterion, such as most efficient, most recent policy, most specific alert management action, etc. At block 315, the method may apply an alert mitigation action based on the alert management policy. In another embodiment, there may not be an alert mitigation action to be applied based on the alert management policy.

Although FIG. 3 shows example blocks of method 300 in some implementation, method 300 may include additional blocks, fewer blocks, different blocks, or differently arranged blocks than those depicted in FIG. 3. Those skilled in the art will understand that the principles presented herein may be implemented in any suitably arranged processing system. Additionally, or alternatively, two or more of the blocks of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that causes a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   receiving, by a management controller, a notification regarding a state transition of an information handling system, wherein the state transition indicates entering a pre-boot process;
   determining an alert management policy associated with the notification regarding the state transition of the information handling system associated with the entering of the pre-boot process; and
   applying an alert management action to enforce the alert management policy that includes masking network interface card events, wherein the alert management action is to unmask an alert.

2. The method of claim 1, wherein the alert management action is to mask an alert.

3. The method of claim 1, wherein the alert management action is to block generation of an event.

4. The method of claim 1, wherein the state transition of the information handling system is associated with a pre-boot execution environment.

5. The method of claim 1, wherein the state transition of the information handling system is associated with a system management mode.

6. The method of claim 1, wherein the notification is further associated with entering a pre-boot execution environment.

7. An information handling system, comprising:
   a processor; and
   a memory device storing code that when executed causes the processor to perform operations, the operations including:
      receiving a notification regarding a state transition of the information handling system, wherein the state transition indicates exiting a pre-boot process;
      determining an alert management policy associated with the notification regarding the state transition of the information handling system associated with the exiting of the pre-boot process; and
   applying an alert management action to enforce the alert management policy that includes masking network events, wherein the alert management action is to unmask an alert.

8. The information handling system of claim 7, wherein the alert management action is to mask an alert.

9. The information handling system of claim 7, wherein the state transition of the information handling system is associated with a pre-boot execution environment.

10. The information handling system of claim 7, wherein the state transition of the information handling system is associated with a system management mode.

11. The information handling system of claim 7, wherein the notification is further associated with exiting a pre-boot execution environment.

12. A non-transitory computer readable medium to store instructions that are executable to perform operations comprising:
   receiving a notification regarding a state transition of an information handling system, wherein the notification indicates exiting a system management mode;
   determining an alert management policy associated with the notification regarding the state transition of the information handling system associated with exiting the system management mode; and
   applying an alert management action to enforce the alert management policy that includes unmasking network packets, wherein the alert management action is to unmask an alert.

13. The non-transitory computer readable medium of claim 12, wherein the alert management action is to mask an alert.

14. The non-transitory computer readable medium of claim 12, wherein the state transition of the information handling system is associated with a pre-boot execution environment.

15. The non-transitory computer readable medium of claim 12, wherein the state transition of the information handling system is associated with entering thea system management mode.

16. The non-transitory computer readable medium of claim 12, wherein the notification is further associated with a pre-boot failure.

17. The non-transitory computer readable medium of claim 12, wherein the alert management action is to block generation of an event.

\* \* \* \* \*